(12) United States Patent
Lim et al.

(10) Patent No.: US 10,566,911 B2
(45) Date of Patent: Feb. 18, 2020

(54) DEVICE AND METHOD FOR CONTROLLING INVERTER BASED ON PREDETERMINED TIME DURATIONS AND MAGNITUDE OF THE DC LINK VOLTAGE

(71) Applicant: LSIS CO., LTD., Anyang-si, Gyeonggi-do (KR)

(72) Inventors: Deok-Young Lim, Anyang-si (KR); Hu-Jin Lee, Anyang-si (KR); Chun-Suk Yang, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/278,559

(22) Filed: Feb. 18, 2019

(65) Prior Publication Data

US 2019/0267913 A1 Aug. 29, 2019

(30) Foreign Application Priority Data

Feb. 26, 2018 (KR) .................. 10-2018-0023029

(51) Int. Cl.
| | |
|---|---|
| *H02M 7/5387* | (2007.01) |
| *H02M 1/36* | (2007.01) |
| *H02M 5/458* | (2006.01) |
| *H02M 1/32* | (2007.01) |
| *H02M 7/06* | (2006.01) |

(Continued)

(52) U.S. Cl.
CPC ......... *H02M 7/53871* (2013.01); *H02M 1/32* (2013.01); *H02M 1/36* (2013.01); *H02M 5/458* (2013.01); *H02M 5/4585* (2013.01); *H02M 7/062* (2013.01); *H02M 7/5395* (2013.01); *H02P 1/08* (2013.01); *H02P 27/06* (2013.01); *H02P 27/08* (2013.01)

(58) Field of Classification Search
CPC ....... H02M 7/48; H02M 7/537–53873; H02M 7/5395; H02M 7/062; H02M 1/36
See application file for complete search history.

(56) References Cited

U.S. PATENT DOCUMENTS 7,613,964 B2 * 11/2009 Finney ............... G01R 31/3277
714/724
9,812,998 B2 * 11/2017 Lim ......................... F16P 3/00
(Continued)

FOREIGN PATENT DOCUMENTS

| JP | H11341820 A | 12/1999 |
|---|---|---|
| JP | 2005245049 A | 9/2005 |

(Continued)

OTHER PUBLICATIONS

European Search Report for related European Application No. 19159277.3; action dated Jul. 5, 2019; (8 pages).

(Continued)

*Primary Examiner* — Jeffrey A Gblende
*Assistant Examiner* — Nusrat Quddus
(74) *Attorney, Agent, or Firm* — K&L Gates LLP (57) ABSTRACT

A device and method for controlling an inverter is disclosed. The inverter-controlling device in accordance with the present disclosure determines an operation state of a switching element of an initial charging module based on predetermined time durations and a magnitude of a DC link voltage measured at each of time points corresponding to the predetermined time durations.

6 Claims, 6 Drawing Sheets

(51) Int. Cl.
*H02M 7/5395* (2006.01)
*H02P 1/08* (2006.01)
*H02P 27/06* (2006.01)
H02P 27/08 (2006.01)

(56) References Cited

U.S. PATENT DOCUMENTS

| | | | |
|---|---|---|---|
| 10,003,296 B2* | 6/2018 | Bae | H02P 1/04 |
| 2008/0037304 A1 | 2/2008 | Suzuki et al. | |
| 2009/0168470 A1* | 7/2009 | Chen | H02H 7/122 |
| | | | 363/55 |
| 2012/0055727 A1* | 3/2012 | Omiya | B60L 50/16 |
| | | | 180/279 |
| 2014/0126259 A1* | 5/2014 | Inoue | H02M 1/32 |
| | | | 363/98 |
| 2016/0065103 A1* | 3/2016 | Glenn | H02H 9/002 |
| | | | 318/400.21 |
| 2016/0172992 A1* | 6/2016 | Tallam | H02M 1/36 |
| | | | 363/37 |
| 2018/0267104 A1* | 9/2018 | Yang | H02M 1/32 |

FOREIGN PATENT DOCUMENTS

| | | |
|---|---|---|
| JP | 3849298 B2 | 11/2006 |
| JP | 2012120376 A | 6/2012 |

OTHER PUBLICATIONS

Korean Office Action for related Korean Application No. 10-2018-002302+9; action dated Apr. 18, 2019; (8 pages).

* cited by examiner

FIG. 1

PRIOR ART

FIG. 2

PRIOR ART

DEVICE AND METHOD FOR CONTROLLING INVERTER BASED ON PREDETERMINED TIME DURATIONS AND MAGNITUDE OF THE DC LINK VOLTAGE

CROSS-REFERENCE TO RELATED APPLICATION

Pursuant to 35 U.S.C. § 119(a), this application claims the benefit of earlier filing date and right of priority to Korean Application No. 10-2018-0023029, filed on Feb. 26, 2018, in the Korean Intellectual Property Office, the disclosure of which is incorporated herein in its entirety by reference.

TECHNICAL FIELD

The present disclosure relates to a device and method for controlling an inverter.

BACKGROUND

An inverter is an inverting device that electrically converts DC to AC. An inverter used in the industry receives power supplied from a commercial power supply and varies a voltage and frequency of the power and supplies the varied power to a motor. Accordingly, the inverter may control a operation speed of the motor.

An AC input power input to the inverter is rectified through a rectifying module composed of an element such as a diode, and then is smoothened by a DC link capacitor. When a power is supplied to the inverter without limiting a current while the capacitor is discharged, a large inrush current flows into the inverter. This inrush current causes the element of the rectifying module or the capacitor to be destroyed. Thus, the inverter is typically equipped with an initial charging circuit to limit the inrush current flowing into the DC link capacitor upon powering up of the inverter.

In a low-capacity inverter of smaller than or equal to 7.5 kW, the initial charging circuit is generally composed of a resistor and a switching element connected in parallel with the resistor. A main current that flows from the inverter to a load flows in this initial charging circuit. Thus, when the switching element is opened due to a failure of the initial charging circuit, there is a risk of fire due to a heat from the resistor in the initial charging circuit. Further, in an event of a short circuit occurrence, there is a possibility of a secondary failure of the initial charging circuit due to the inrush current.

Although it is possible to directly monitor a contact state of the switching element in order to detect the failure of the initial charge circuit, there is a problem that a cost of the inverter increases and a size of the inverter increases.

SUMMARY

In order to solve the problem, a purpose of the present disclosure is to provide a device and method for controlling an inverter, where the device and method may simply determine a state of a switching element without requiring an additional component and without increasing a size of the inverter.

In one aspect of the present disclosure, there is provided a device for controlling an inverter, wherein the inverter includes: a rectifying module for rectifying an alternate current (AC) power input from a power supply; a direct current (DC) link capacitor for smoothing and storing a voltage rectified by rectifying module; an inverting module for outputting an AC power of a predetermined voltage and frequency based on a pulse width modulation (PWM) control signal received from an inverter driver; an initial charging module disposed upstream of the DC link capacitor, wherein the initial charging module include an initial charging resistor and a switching element connected in parallel to the initial charging resistor; and a voltage detection module for detecting a DC link voltage charged in the DC link capacitor, the device being characterized in that the device includes: an inverter driver for applying a PWM signal to each of gates of a plurality of switching elements of the inverting module; and a controller configured for determining an operation state of the switching element based on predetermined time durations and a magnitude of the DC link voltage measured at each of time points corresponding to the predetermined time durations.

In one implementation, the controller is further configured: for determining, as a first voltage, the DC link voltage at a first time point at which the DC link voltage reaches a predetermined level; for determining, as a second voltage, the DC link voltage at a second time point at which a first time duration has elapsed since the first time point; for determining, as a third voltage, the DC link voltage at a third time point at which a second time duration has elapsed since the second time point; and for determining an operation state of the switching element based on the first to third voltages and the first and second time durations.

In one implementation, when the DC link voltage reaches the predetermined level, a contact of the switching element is engaged via a voltage across the switching element such that the switching element is switched to an on state in a duration between the second time point and the third time point.

In one implementation, the controller is further configured: when the DC link voltage reaches the predetermined level, for applying an on-signal to the switching element in a duration between the second time point and the third time point.

In one implementation, the controller is further configured for determining that the switching element is in a normal operation state when a following relationship is satisfied:

$$(V2 - V1) \times \frac{T2}{T1} < (V3 - V2)$$

where V1 indicate the first voltage, V2 indicates the second voltage, V3 indicates the third voltage, T1 indicates the first time duration, and T2 indicates the second time duration.

In one implementation, the controller is further configured for determining an operation state of the switching element based on a voltage difference of the DC link voltage generated via on/off switching operations of the switching element when the DC link voltage has been initially charged up to an amount corresponding to an input voltage.

In one implementation, the controller is further configured: for applying an off signal to the switching element at a fourth time point at which a predetermined time duration has elapsed since the third time point; for determining, as a fourth voltage, the DC link voltage at a fifth time point at which a third time duration has elapsed since the fourth time point; for applying an on signal to the switching element at a sixth time point at which a predetermined time duration has elapsed since the fifth time point; for determining, as a fifth voltage, the DC link voltage at a seventh time point at which a fourth time duration has elapsed since the sixth time point; and for determining an operation state of the switching element based on the fourth and fifth voltages and the voltage difference.

In one implementation, the controller is further configured for determining that the switching element is in a normal operation state when a following relationship is satisfied:

$$(V3-V4) > \Delta V \text{ and } (V5-V4) > \Delta V$$

where V4 indicates the fourth voltage, V5 indicates the fifth voltage, and ΔV indicates the voltage difference.

In another aspect of the present disclosure, there is provided a method for controlling an inverter, wherein the inverter includes: a rectifying module for rectifying an alternate current (AC) power input from a power supply; a direct current (DC) link capacitor for smoothing and storing a voltage rectified by rectifying module; an inverting module for outputting an AC power of a predetermined voltage and frequency based on a pulse width modulation (PWM) control signal received from an inverter driver; an initial charging module disposed upstream of the DC link capacitor, wherein the initial charging module include an initial charging resistor and a switching element connected in parallel to the initial charging resistor; and a voltage detection module for detecting a DC link voltage charged in the DC link capacitor, the method being characterized in that the method includes: checking a DC link voltage charged in the DC link capacitor in a state where an initial power is injected into the DC link capacitor of the inverter via the initial charging resistor; determining, as a first voltage, the DC link voltage at a first time point at which the DC link voltage reaches a predetermined level; determining, as a second voltage, the DC link voltage at a second time point at which a first time duration has elapsed since the first time point; determining, as a third voltage, the DC link voltage at a third time point at which a second time duration has elapsed since the second time point; and determining an operation state of the switching element based on the first to third voltages and the first and second time durations.

In one implementation, the method further includes: applying an off signal to the switching element at a fourth time point at which a predetermined time duration has elapsed since the third time point; determining, as a fourth voltage, the DC link voltage at a fifth time point at which a third time duration has elapsed since the fourth time point; applying an on signal to the switching element at a sixth time point at which a predetermined time duration has elapsed since the fifth time point; determining, as a fifth voltage, the DC link voltage at a seventh time point at which a fourth time duration has elapsed since the sixth time point; and determining an operation state of the switching element based on the fourth and fifth voltages and a voltage difference, wherein the voltage difference indicates a voltage difference of the DC link voltage generated via on/off switching operations of the switching element when the DC link voltage has been initially charged up to an amount corresponding to an input voltage.

According to one embodiment of the present disclosure, in an inverter using an initial charging circuit including a switching element such as a relay connected in parallel with a resistor, the present device may diagnose the state of the switching element during the power injection to the inverter without adding a component or circuit.

Further, according to one embodiment of the present disclosure, whether the first condition using a curve of the charged voltage due to the RC time constant of the initial charging resistor and the DC link capacitor is satisfied is determined. Then, whether the second condition that corrects the error from the first condition and employs the change in the DC link voltage caused by the on/off switching operation of the switching element when the DC link voltage has been charged up to an amount corresponding to the input voltage is satisfied is determined. Thus, the present device and method can easily determine the operation state of the switching element without requiring an additional component and without increasing a size of the inverter.

Further specific effects of the present disclosure as well as the effects as described above will be described in conduction with illustrations of specific details for carrying out the invention.

DETAILED DESCRIPTION

Hereinafter, a device and method for controlling an inverter in accordance with the present disclosure will be described with reference to the accompanying drawings.

For simplicity and clarity of illustration, elements in the figures, are not necessarily drawn to scale. The same reference numbers in different figures, denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Unless determined otherwise, all terms used herein have the same meaning as commonly understood by one of ordinary skill in the art. When the terms used herein are in conflict with a general meaning of the term, the meaning of the term is in accordance with a definition used herein.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as determined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Hereinafter, an operation of a conventional initial charging circuit is illustrated with reference to FIG. 1 and FIG. 2. Referring to FIGS. 3 to 6, a device and method for controlling an inverter in accordance with an embodiment of the present disclosure will be described.

Figure 1:
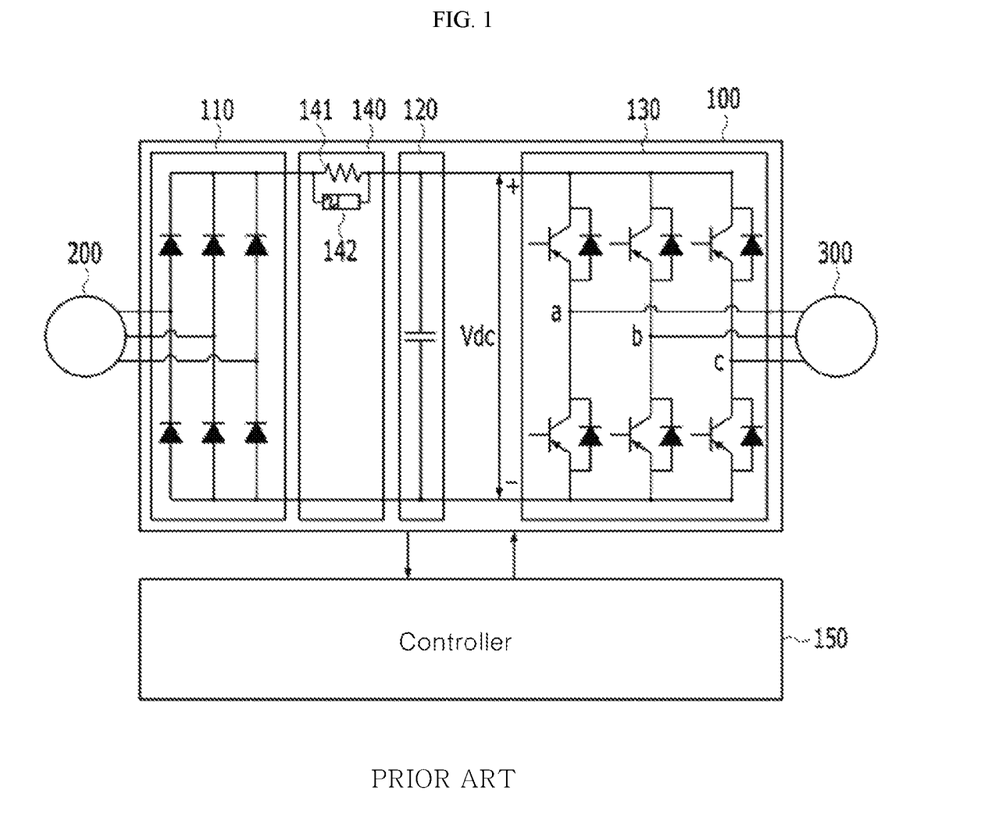
FIG. 1 shows a configuration of a conventional inverter system.

FIG. 1 shows a configuration of a conventional inverter system.

An inverter 100 includes a rectifying module 110 for rectifying an AC power of three phases input from a power supply 200, a DC link capacitor 120 for storing a rectified input voltage, an inverting module 130 for performing a pulse width modulation (PWM) of the voltage stored in the DC link capacitor 120 according to a predetermined voltage and frequency command and outputting an AC voltage, an initial charging module 140 disposed between the rectifying module 110 and the DC link capacitor 120 for preventing an inrush current, and a controller 150 for providing a PWM signal to the inverting module 130 based on a voltage command and a frequency command.

An AC power of a predetermined frequency as output from the inverting module 130 may be supplied to a load 300 such as a motor. In this connection, a driving speed of the load 300 may be controlled by varying a voltage and frequency based on a PWM output using switching elements constituting the inverting module 130.

The initial charging module 140 may prevent overcurrent which may be caused by an inrush current input to the inverter 100 and may prevent insulation breakdown of each element of the inverter 100. The initial charging module 140 includes an initial charging resistor 141 and a relay 142 connected in parallel thereto. The initial charging resistor 141 operates only when an initial power is supplied to the inverter 100. After the initial charging operation is terminated, a current flow is switched to the relay 142 to prevent unnecessary power loss by the initial charging resistor 141.

That is, in the conventional case, when the power is supplied to the initial charging resistor 141, the rectifying module 110 limits a current of the rectified power and supplies the limited current to the DC link capacitor 120. When a charged voltage of the DC link capacitor 120 reaches a certain level LV (low voltage) (clear level), the relay 142 is turned on. Thus, the DC link capacitor 120 which has been charged through the initial charging resistor 141 may be charged through the relay 142.

In this connection, the LV clear level refers to a magnitude of the charged voltage of the DC link capacitor 120 when internal elements of the inverter are not damaged by the current transmitted from the rectifying module 110. The LV clear level may be determined experimentally and may be set differently according to embodiments.

Hereinafter, a conventional operation of establishing a power in the inverter system of FIG. 1 will be described with reference to FIG. 2.

Figure 2:
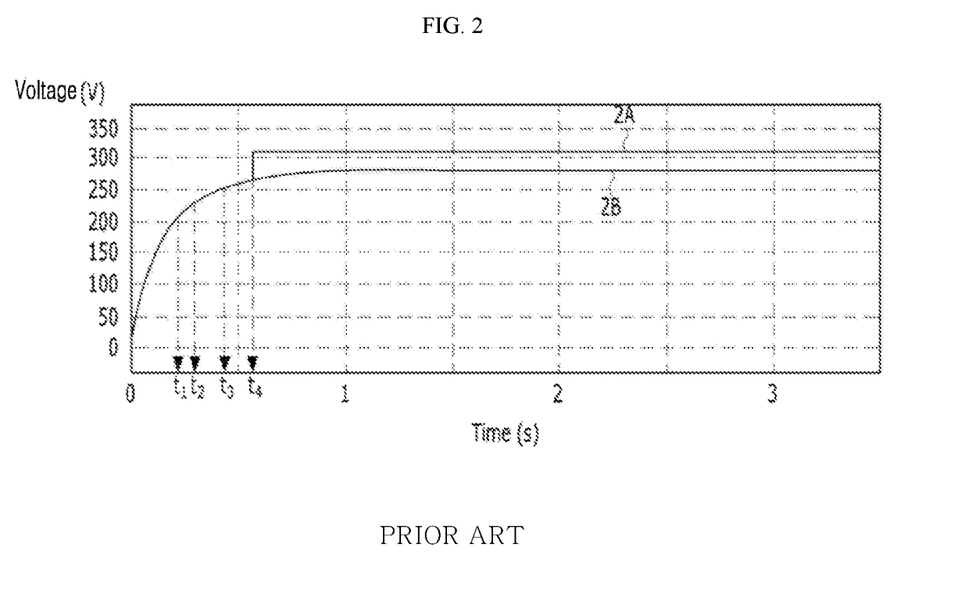
FIG. 2 shows a curve of a charged voltage of a DC link capacitor at an initial power-up to the inverter of FIG. 1.

FIG. 2 shows a curve of a charged voltage of the DC link capacitor at an initial power-up to the inverter of FIG. 1.

In FIG. 2, 2A shows a curve of the charged voltage of the DC link capacitor 120 when a power is supplied to the inverter when the relay 142 is in a normal operation state. 2B shows a curve of the charged voltage of the DC link capacitor 120 when the power is supplied to the inverter when the relay 142 is in an abnormal operation state.

When the power is supplied to the initial charging resistor 141, the power is supplied to the controller 150 at a predetermined time t1, for example, at about 300 ms. When the voltage charged in the DC link capacitor 120 reaches the predetermined level LV (clear level) at a time point t2, the relay 142 is turned on at a time point t3 (about 500 to 600 ms), that is, a contact of the relay 142 starts to be engaged. An operation of the relay 142 starts at a time point t4 (about 650 to 750 ms). A time spacing from the time point t2 to the time point t3 when the relay 142 starts to turn on and a time spacing from the time point t3 to the time point t4 when the relay 142 starts to operate are due to a signal propagation delay in the circuit. Hereinafter, for the sake of convenience of descriptions, the present disclosure will be described without regard to the delay between the time t3 at which the relay 142 starts to turn on and the time t4 at which the operation of the relay 142 starts.

In FIG. 2, when the relay 142 is operating normally, the DC voltage smoothed by the rectifying module 110 is applied directly to the DC link capacitor 120 through the relay 142 so that the curve 2A appears. However, when the relay 142 is in an erroneous operation state, the DC link capacitor 120 is charged through the initial charging resistor 141, so that the curve 2B appears due to a RC time constant time of the DC link capacitor 120 and the initial charging resistor 141.

Thus, in the conventional case, when the relay 142 malfunctions, such as the contact being disengaged, there is a problem that a large current flows for a long time and a fire may occur due to a heat generation from the initial charging resistor 141.

Further, when the power is repeatedly supplied while the contact is engaged due to an operation failure of the relay 142, a large inrush current flows into the rectifying module 110 and DC link capacitor 120, such that and the elements may be damaged.

The present disclosure is to solve the conventional problem as described above. The present disclosure may propose a device and method for controlling the inverter safely without increasing the cost and size of the inverter by the controller of the inverter diagnosing a state of the relay using the RC time constant of the initial charging resistor and the DC link capacitor.

That is, when the power is supplied to the inverter, the charged voltage of the DC link capacitor may have a curve over time due to the RC time constant of the initial charging resistor and the DC link capacitor until the relay operates. In this connection, the relay operates normally until the DC link capacitor has been charged up to an amount corresponding to an input voltage to the inverter. Thus, the curve of the charged voltage due to the RC time constant of the initial charging resistor and the DC link capacitor is not maintained. In one embodiment of the present disclosure, the diagnosis of the state of the relay may be achieved by using the curve of the charged voltage of the DC link capacitor.

Figure 3:
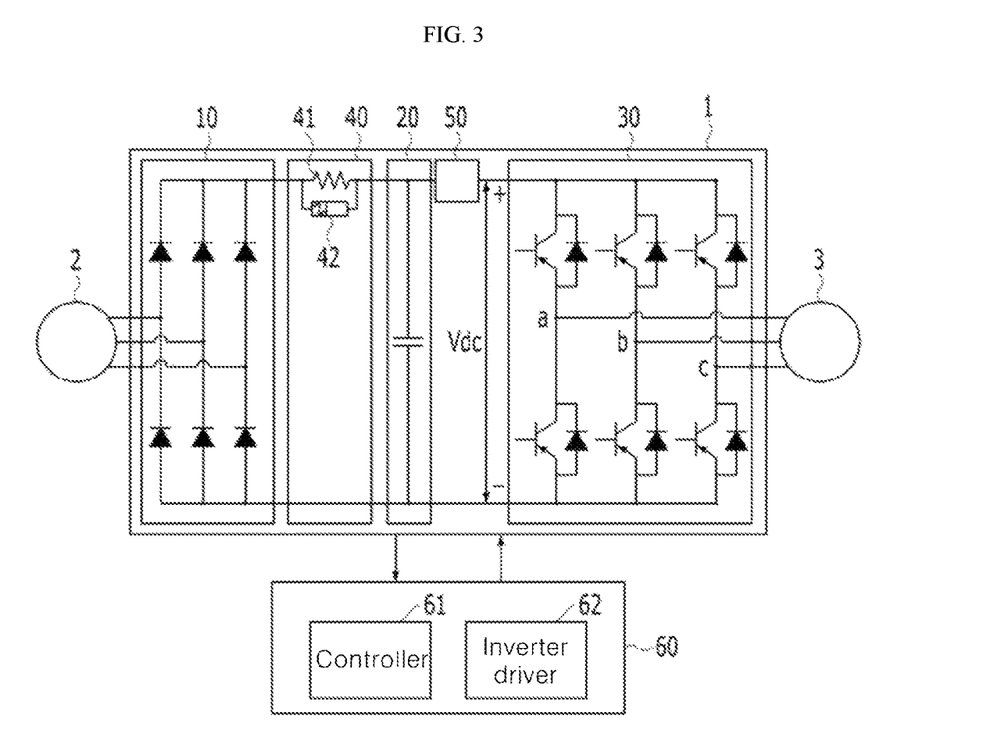
FIG. 3 is a block diagram illustrating an inverter system to which an inverter-controlling device in accordance with an embodiment of the present disclosure is applied.

FIG. 3 is a block diagram illustrating an inverter system to which an inverter-controlling device in accordance with an embodiment of the present disclosure is applied.

As shown in FIG. 3, an inverter system to which an inverter-controlling device in accordance with an embodiment of the present disclosure is applied includes an inverter 1, a three-phase power supply 2 for applying an AC power to the inverter 1, and a load 3 such as a motor receiving the three-phase AC power output from the inverter 1 and being driven.

Further, the inverter 1 may include a rectifying module 10, a DC link capacitor 20, an inverting module 30, an initial charging module 40, and a voltage detection module 50. Furthermore, the inverter-controlling device 60 according to an embodiment of the present disclosure may include a controller 61 and an inverter driver 62. The controlling device 60 in accordance with one embodiment of the present disclosure is shown to be provided outside the inverter 1 for convenience of illustration. However, the present disclosure is not limited thereto. The controlling device 60 may be provided inside the inverter 1. That is, the controlling device 60 may be provided on a control printed circuit board (control PCB) inside the inverter 1.

The rectifying module 10 may be constituted with a combination of power conversion elements such as a plurality of diodes. The AC power input from the power supply 2 may be rectified by the rectifying module 10.

The DC link capacitor 20 may smooth and store the voltage rectified by the rectifying module 10.

The inverting module 30 may output an AC power of a predetermined voltage and frequency via the switching of the plurality of switching elements based on the PWM control signal as received from the inverter driver 62.

The initial charging module 40 may prevent overcurrent which may be caused by the inrush current input to the inverter 1 and may prevent insulation breakdown of each element of the inverter 1. The initial charging module 40 may include an initial charging resistor 41 and a switching element 42 connected in parallel thereto. The switching element 42 may be, for example, a relay, but is not limited thereto. The switching element 42 may switch to the on state or the off state depending on the on signal or the off signal from the controller 61. The switching element 42 may be embodied as each of a variety of switching elements, which may switch to the on state or the off state via an engagement or disengagement of the contact thereof depending on a voltage across the switch element.

Further, the voltage detection module 50 may detect the DC voltage of the DC link capacitor 20 and provide the detected DC voltage to the controller 61.

According to one embodiment of the present disclosure, the controller 61 may diagnose the state of the switching element 42 by using the charged voltage of the DC link capacitor 20 due to the RC time constant of the initial charging resistor 41 and the DC link capacitor 20. The controller 61 may supply an on or off signal to the switching element 42. A detailed operation of the controller 61 will be described below with reference to the drawings.

The inverter driver 62 may control the driving of the inverting module 30 by applying a PWM signal to gates of a plurality of switching elements of the inverting module 30. A scheme for generating the PWM signal by the inverter driver 62 may be well known in the technical field to which the present disclosure belongs, and a detailed description thereof will be omitted.

Figure 4:
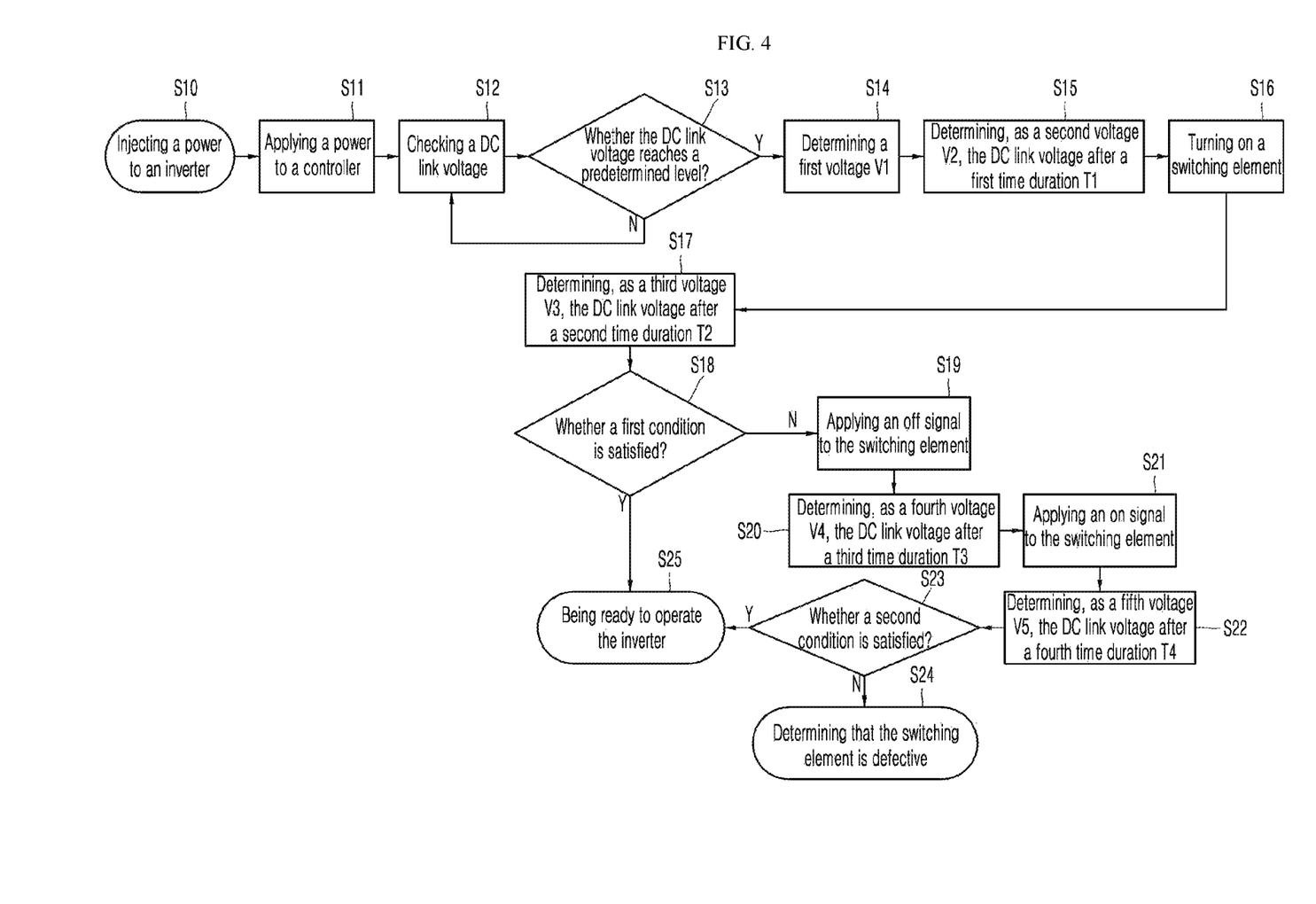
FIG. 4 is a flow chart illustrating a method for controlling an inverter in accordance with an embodiment of the present disclosure.

FIG. 4 is a flow chart illustrating a method for controlling an inverter according to an embodiment of the present disclosure.

As shown in FIG. 4, in an embodiment of the present disclosure, when power is supplied from the power supply 2 to the inverter 1 S10, the switching element 42 of the initial charging module 40 is in an off state, and the DC link capacitor 20 starts to be charged through the initial charging resistor 41.

Power may be applied to the controller 61 in a predetermined time after the power supply at the operation S10 S11. When the controller 61 is provided inside the inverter 1, the power may be applied to the controller 61 via a switched mode power supply (SMPS) on a power PCB inside the inverter 1. When the controller 61 is provided outside the inverter 1, the power may be supplied to the controller 61 via a separate power supply device.

When the power is applied to the controller 61, the voltage detection module 50 detects the DC link voltage and provides the detected voltage to the controller 61 so that the controller 61 may check the DC link voltage. That is, the voltage detection module 50 continuously detects the DC link voltage. The controller 61 may receive the DC link voltage from the voltage detection module 50 and check the DC link voltage.

When the controller 61 is provided inside the inverter 1, the DC link voltage may be transmitted from the voltage detection module 50 to the controller 61 via a PCB wiring. When the controller 61 is provided outside the inverter, a communication unit (not shown) for transmitting data related to the DC link voltage over a wireless or wired network may be separately included in the inverter 1 for providing the DC link voltage detected by the voltage detection module 50 to the controller 61.

Then, when the DC link voltage reaches a certain voltage LV (clear level) S13, the controller 61 may determine the DC link voltage at the corresponding time as V1 S14. The LV (clear level) may be provided as a setting parameter for the inverter 1. The clear level may be pre-stored in a memory (not shown) inside the inverter 1. In one embodiment of the present disclosure, an example in which the DC link voltage at a time when the DC link voltage reaches the LV clear level is determined as the V1 is set forth. This is an ideal case. Actually, there may occur a delay between a time when the DC link voltage reaches the LV clear level and a time when the controller 61 receives the DC link voltage V1 at the corresponding time from the voltage detection module 50.

The controller 61 may determine, as V2, a DC link voltage after a $T_1$ time duration from the V1 detection point S15. When the DC link voltage reaches the LV clear level S14, a contact of the switching element 42 starts to be engaged S14 due to a voltage across the switching element 42. Thus, after the $T_1$ time duration, the switching element 42 may be turned on. The $T_1$ time duration may be set to be shorter than a time duration for which the switching element 42 has switched to turn on after the voltage reaches the LV clear level.

However, in one embodiment of the present disclosure, an example in which when the DC link voltage reaches the LV clear level, the switching element 42 is turned on due to a voltage across the switching element 42 is illustrated. The present disclosure is not limited thereto.

That is, the switching element 42 may be turned on via an on signal from the controller 61. That is, when a predetermined time has elapsed since the determination of the DC link voltage V2, the controller 61 may apply the on signal to the switching element 42, such that the switching element 42 may be turned on.

In this connection, when the controller 61 is provided inside the inverter 1, the on signal provision to the switching element 42 may be achieved via a PCB wiring or through an internal transmission medium in the inverter 1. Alternatively, when the controller 61 is provided outside the inverter 1, a separate communication unit (not shown) for transmitting the on-signal to the switching element 42 may be included in the inverter 1.

The controller 61 may then determine, as V3, a DC link voltage after a $T_2$ time duration from the detection time of the DC link voltage V2. In this connection, the $T_2$ time duration may be pre-set to be subsequent to a time when the switching element 42 is switched to an on state via a voltage across the element 42 or a time when the controller 61 applies the on signal to the switching element 42.

The controller 61 may check using the V1, V2, V3, $T_1$ and $T_2$ whether a first condition for determination of a normal operation of the switching element 42 is satisfied S18. The first condition employs a fact that a slope of a curve of the charged voltage due to the RC time constant of the initial charging resistor 41 and the DC link capacitor 20 always decreases over time. In this connection, when a condition of a following Relationship 1 is satisfied, it may be determined that the switching element 42 is in a normal operation state:

$$(V2 - V1) \times \frac{T2}{T1} < (V3 - V2) \qquad \text{[Relationship 1]}$$

Thereafter, when the first condition as the Relationship (1) is satisfied, the controller 61 determines that the switching element 42 is in a normal operation state, and thus the controller 61 may be ready to operate the inverter 1. To the contrary, when the first condition as the Relationship (1) above is not satisfied, the controller 61 may apply an turn-off signal to the switching element 42 S19 and thus the switching element 42 may switch to be turned off. In this way, the DC link capacitor 20 may be charged through the initial charging resistor 41.

That is, when the first condition is not satisfied, the controller 61 may switch the switching element 42 back to the off-state. Thus, the controller 61 may trigger a procedure for checking a second condition for a determination of an normal operation of the switching element 42. Depending on an internal environment in or an external environment to the inverter 1 or a state of the voltage detection module 50, the first condition may not be satisfied even when the switching element 42 is in a normal operation state. In one embodiment of the present disclosure, the second condition may be used to correct the determination error to accurately diagnose the state of the switching element 42.

The controller 61 may then determine, as V4, a DC link voltage after a $T_3$ time duration since a time when the controller applies the off signal to the switching element 42 S20. The $T_3$ time duration may be set to be sufficient after the switching element 41 is turned off.

Thereafter, when a predetermined time has elapsed since the determination of the DC link voltage V4, the controller 61 may apply an on-signal to the switching element 42 S21. Thus, the switching element 42 may be turned on.

The controller 61 may then determine, as V5, a DC link voltage after a $T_4$ time duration since the time when the controller applies the on-signal to switching element 42 S22.

The controller 61 may check whether or not the second condition for discrimination of the normal operation state of the switching element 42 is satisfied, using a change of the DC link voltage, that is, a voltage difference ΔV resulting from on/off switching operations of the switching element 42 while the V3, V4, V5 and DC link voltage have been charged up to an amount corresponding to the input voltage S23. The second condition may employ a change in the DC link voltage caused by the on/off switching operations of the switching element 42 when the DC link voltage of the DC link capacitor 20 is initially charged up to the input voltage. In this connection, the difference ΔV of the DC link voltage caused by the on/off switching operations of the switching element 42 may be generated due to the voltage across the initial charging resistor 41. In this connection, when the second condition as a following Relationship (2) is satisfied, it may be determined by the controller 61 that the switching element 42 is in a normal operation state.

$$(V3-V4) > \Delta V \text{ and } (V5-V4) > \Delta V \qquad \text{[Relationship 2]}$$

Thereafter, when the second condition based on the Relationship 2 above is satisfied, it is determined by the controller 61 that the switching element 42 is in a normal operation state. Then, the controller 61 may be read to operate the inverter 1. To the contrary, when the second condition based on the Relationship 2 above is not satisfied, the controller 61 may determine that the switching element 42 is defective and may cause a faulty trip for the switching element 42 S24. This eliminates a risk of the fire due to the heat generated from the initial charging resistor 410 at the time of the failure (being an open state) of the switching element 24. This is further to remove the possibility that the inrush current may occur due to frequent on/off switching operations of the inverter 1 due to a short circuit (failure) of the switching element 24.

Figure 5:
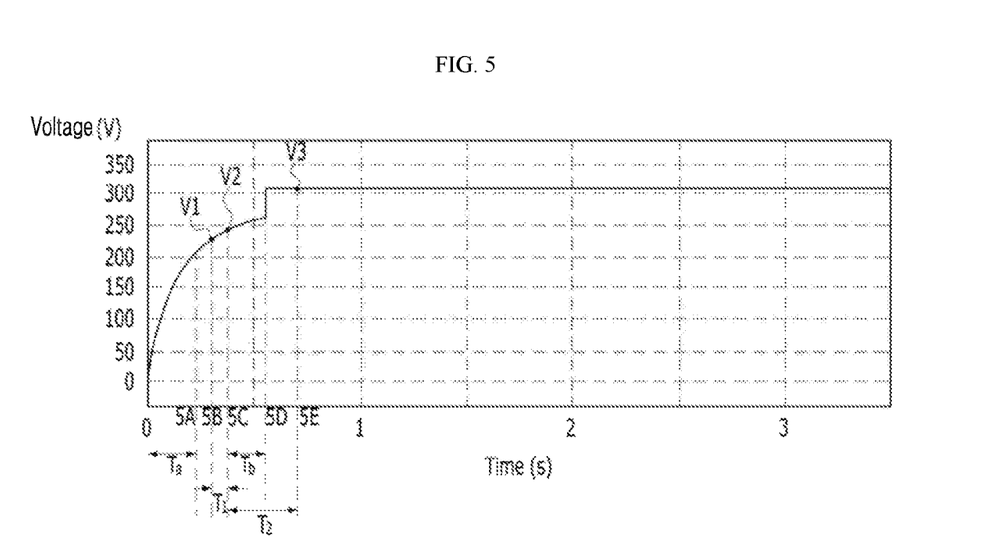
FIG. 5 shows an example of a voltage waveform of a DC link capacitor for illustrating an operation of the device in accordance with the present disclosure when a switching element is operating normally.

FIG. 5 shows an example of a voltage waveform of a DC link capacitor for illustrating an operation of the device in accordance with the present disclosure when a switching element is operating normally. Hereinafter, a reference to FIG. 5 and FIG. 4 will be together made.

As shown in FIG. 5, when the inverter 1 is powered on S10, the DC link capacitor 20 begins to be charged to form a curve of a charged voltage due to the RC time constant of the initial charging resistance 41 of the initial charging module 40 and the DC link capacitor 20.

The power is applied to the controller 61 at a time point 5A when a predetermined time duration Ta elapses after the current is applied (S11). The controller 61 may check the DC link voltage from the voltage detection module 50 (S12). The controller 61 may determine, as V1, a DC link voltage at a time point 5B when the DC link voltage reaches a predetermined level LV (clear level) (S13 and S14). However, in this embodiment of the present disclosure, it is exemplified that the DC link voltage at the time point 5B when the DC link voltage reaches the LV clear level is determined as the V1. This is an ideal case. Actually, a slight delay may occur, resulting in a slight difference between the time point at which the DC link voltage reaches the LV clear level and the time point at which the V1 is determined.

The DC link voltage at a time point 5C at which a $T_1$ time duration has elapsed after the time point 5B is determined as V2 (S15). Since the time point 5B at which the DC link voltage reaches the LV clear level, the contact of the switching element 42 starts to be engaged. Thus, the switching element 42 may be switched to turn on at a time point 5D (S16). Alternatively, at the time point 5D when a $T_b$ time duration has elapsed since the time point 5B at which the DC link voltage reaches the LV clear level, the controller 61 may apply the turn on signal to the switching element 42. Thus, the switching element 42 having the on-state of may cause the DC link voltage to rise up to the input voltage.

In FIG. 5, the time point at which the contact of the switching element 42 starts to be engaged (or the time point at which the ON signal is provided from the controller to the switching element 42) and the time point at which the DC link voltage begins to rise (that is, the time point at which the switching element 42 is turned on) are shown to be identical with each other. However, a time difference between the time point at which the contact of the switching element 42 starts to be engaged and the time point at which the DC link voltage begins to rise may occur. This is as described with reference to FIG. 2.

Then, the controller 61 determines, as V3, the DC link voltage at the time point 5E when a $T_2$ time duration has elapsed since the time point 5C (S17). When the first condition based on the Relationship 1 is satisfied, the controller 61 may determine that the switching element 42 in a normal operation state. Then, the controller may be ready to operate the inverter (S25).

Figure 6:
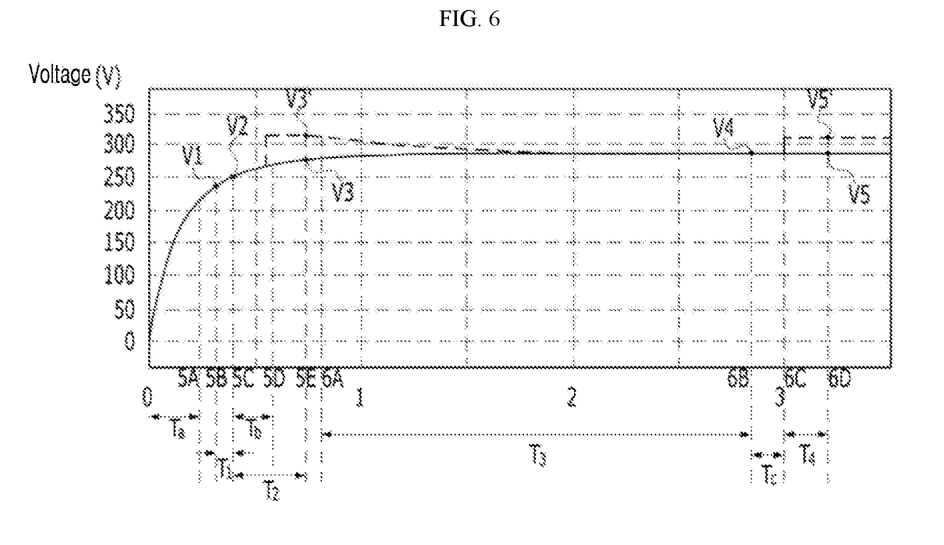
FIG. 6 shows an example of a voltage waveform of a DC link capacitor for illustrating an operation of the device in accordance with the present disclosure when a switching element is operating abnormally.

FIG. 6 shows an example of a voltage waveform of a DC link capacitor for illustrating an operation of the device in accordance with the present disclosure when a switching element is operating abnormally. Hereinafter, a reference to FIG. 6 and FIG. 4 will be together made. In FIG. 6, the operations of the device before the time point 5E are the same as in FIG. 5, and detailed descriptions thereof will be omitted.

Because of the erroneous operation of the switching element 42, the switching element 42 has not switched to the on state at the time point 5D. In this connection, the DC link voltage V3 determined at the time point 5E may be smaller than V3 when the switching element 42 is in a normal operation state (the latter V3 may be indicated as V3' in FIG. 6; in FIG. 6, the DC link voltage curve when the switching element is operating normally is indicated by a dotted line). Accordingly, since the first condition is not satisfied, the switching element 42 may be switched to the off state S19 via the off signal from the controller 61 at a time point 6A.

The controller 61 then determines, as V4, the DC link voltage at a time point 6B when a $T_3$ time duration has elapsed since the time point 6A (S20). Then, the controller 61 applies the on signal to the switching element 42 at a time point 6C when a $T_C$ time duration has elapsed since the time point 6B (S21). Thus, the switching element 42 may be turned on.

The controller 61 may then determine, as V5, the DC link voltage at a time point 6D when a $T_4$ time duration has elapsed since the time point 6C (S22).

When the second condition based on the Relationship 2 is satisfied, the controller 61 may determine that the switching element 42 is in a normal operation state and may be ready to operate the inverter (S25). To the contrary, when the Relationship 2 is not satisfied, it is determined by the controller 61 that the switching element 42 is defective (S24). Thus, the controller 61 may generate a faulty trip for the switching element 42.

When the switching element 42 is in a normal operation state, the switching element 42 operates as indicated by the dotted line and thus the DC link voltage at the time point 6C reaches V5'. However, when the switching element 42 is in an abnormal operation state, the switching element 42 operates as indicated by the solid line and thus the DC link voltage reaches V5 being smaller than V5'. As a result, the second condition based on the Relationship 2 is not satisfied. Thus, the controller may determine that the switching element is defective.

According to one embodiment of the present disclosure, in an inverter using an initial charging circuit including a switching element such as a relay connected in parallel with a resistor, the present device may diagnose the state of the switching element during the power injection to the inverter without adding a component or circuit.

Further, according to one embodiment of the present disclosure, whether the first condition using a curve of the charged voltage due to the RC time constant of the initial charging resistor 41 and the DC link capacitor 20 is satisfied is determined. Then, whether the second condition that corrects the error from the first condition and employs the change in the DC link voltage caused by the on/off switching operation of the switching element 42 when the DC link voltage has been charged up to an amount corresponding to the input voltage is satisfied is determined. Thus, the present device and method can easily determine the operation state of the switching element without requiring an additional component.

It will be apparent to those skilled in the art that various modifications and variations may be made in the present invention without departing from the spirit of the present disclosure. The technical scope of the present disclosure is not limited to the contents described in the embodiments but should be determined by the claims and equivalents thereof

What is claimed is:

1. A device for controlling an inverter, wherein the inverter comprising a rectifying module for rectifying an alternate current (AC) power input from a power supply, a direct current (DC) link capacitor for smoothing and storing a voltage rectified by the rectifying module, an inverting module for outputting an AC power of a predetermined voltage and frequency based on a pulse width modulation (PWM) control signal received from an inverter driver, an initial charging module disposed upstream of the DC link capacitor, and a voltage detection module for detecting a DC link voltage charged in the DC link capacitor, wherein the initial charging module includes an initial charging resistor and a first switching element connected in parallel to the initial charging resistor, wherein the device includes:
- an inverter driver for applying a PWM signal to each of gates of a plurality of switching elements of the inverting module; and
- a controller configured to determine an operation state of the first switching element based on predetermined time durations and a magnitude of the DC link voltage measured at each of time points corresponding to the predetermined time durations, wherein the controller is further configured to:
- determine, as a first voltage, the DC link voltage at a first time point at which the DC link voltage reaches a predetermined level;
- determine, as a second voltage, the DC link voltage at a second time point at which a first time duration has elapsed since the first time point;
- determine, as a third voltage, the DC link voltage at a third time point at which a second time duration has elapsed since the second time point;
- determine an operation state of the first switching element based on the first to third voltages and the first and second time durations;
- determine an operation state of the first switching element based on a voltage difference of the DC link voltage generated via on/off switching operations of the first switching element when the DC link voltage has been initially charged up to an amount corresponding to an input voltage;
- apply an off signal to the first switching element at a fourth time point at which a first predetermined time duration has elapsed since the third time point;
- determine, as a fourth voltage, the DC link voltage at a fifth time point at which a third time duration has elapsed since the fourth time point;
- apply an on signal to the first switching element at a sixth time point at which a second predetermined time duration has elapsed since the fifth time point;
- determine, as a fifth voltage, the DC link voltage at a seventh time point at which a fourth time duration has elapsed since the sixth time point; and
- determine an operation state of the first switching element based on the fourth and fifth voltages and the voltage difference.

2. The device of claim 1, wherein when the DC link voltage reaches the predetermined level, a contact of the first switching element is engaged via a voltage across the first switching element such that the first switching element is switched to an on state in a duration between the second time point and the third time point.

3. The device of claim 1, wherein when the DC link voltage reaches the predetermined level, the controller is further configured to apply an on-signal to the first switching element in a duration between the second time point and the third time point.

4. The device of claim 1, wherein the controller is further configured to determine that the first switching element is in a normal operation state when a following relationship is satisfied:

$$(V2 - V1) \times \frac{T2}{T1} < (V3 - V2)$$

where V1 indicate the first voltage, V2 indicates the second voltage, V3 indicates the third voltage, T1 indicates the first time duration, and T2 indicates the second time duration.

5. The device of claim 1, wherein the controller is further configured to determine that the first switching element is in a normal operation state when a following relationship is satisfied:

$$(V3 - V4) > \Delta V \text{ and } (V5 - V4) > \Delta V$$

where V4 indicates the fourth voltage, V5 indicates the fifth voltage, and $\Delta V$ indicates the voltage difference.

6. A method for controlling an inverter, wherein the inverter comprising a rectifying module for rectifying an alternate current (AC) power input from a power supply, a direct current (DC) link capacitor for smoothing and storing a voltage rectified by rectifying module, an inverting module for outputting an AC power of a predetermined voltage and frequency based on a pulse width modulation (PWM) control signal received from an inverter driver, an initial charging module disposed upstream of the DC link capacitor, wherein the initial charging module include an initial charging resistor and a switching element connected in parallel to the initial charging resistor, and a voltage detection module for detecting a DC link voltage charged in the DC link capacitor, the method includes:
- checking a DC link voltage charged in the DC link capacitor in a state where an initial power is injected into the DC link capacitor of the inverter via the initial charging resistor;
- determining, as a first voltage, the DC link voltage at a first time point at which the DC link voltage reaches a predetermined level;
- determining, as a second voltage, the DC link voltage at a second time point at which a first time duration has elapsed since the first time point;
- determining, as a third voltage, the DC link voltage at a third time point at which a second time duration has elapsed since the second time point;
- determining an operation state of the switching element based on the first to third voltages and the first and second time durations,
- applying an off signal to the switching element at a fourth time point at which a first predetermined time duration has elapsed since the third time point;
- determining, as a fourth voltage, the DC link voltage at a fifth time point at which a third time duration has elapsed since the fourth time point;
- applying an on signal to the switching element at a sixth time point at which a second predetermined time duration has elapsed since the fifth time point;
- determining, as a fifth voltage, the DC link voltage at a seventh time point at which a fourth time duration has elapsed since the sixth time point; and
- determining an operation state of the switching element based on the fourth and fifth voltages and a voltage difference, wherein the voltage difference indicates a voltage difference of the DC link voltage generated via on/off switching operations of the switching element when the DC link voltage has been initially charged up to an amount corresponding to an input voltage.

\* \* \* \* \*